US012730614B2

(12) United States Patent
Kandasamy et al.

(10) Patent No.: US 12,730,614 B2
(45) Date of Patent: Sep. 8, 2026

(54) INTELLIGENT ATTRIBUTE VALUE SUBSTITUTION IN INFRASTRUCTURE AS CODE (IAC) GENERATION

(71) Applicant: International Business Machines Corporation, Armonk, NY (US)

(72) Inventors: Malarvizhi Kandasamy, Bangalore (IN); Akshay Thyagaraja Kotagal, Bangalore (IN); Srinivasan Nanduri, Bangalore (IN); Ankita Dutta, Kolkata (IN); Abhineet Karn, Surat (IN); Pavan Kumar Reddy Yannam, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

(21) Appl. No.: 18/236,069

(22) Filed: Aug. 21, 2023

(65) Prior Publication Data

US 2025/0068397 A1 Feb. 27, 2025

(51) Int. Cl.
*G06F 8/35* (2018.01)
*G06F 8/75* (2018.01)

(52) U.S. Cl.
CPC . *G06F 8/35* (2013.01); *G06F 8/75* (2013.01)

(58) Field of Classification Search
CPC .................................... G06F 8/35; G06F 8/75
USPC ........................................................ 717/104
See application file for complete search history.

(56) References Cited

U.S. PATENT DOCUMENTS

| | | | | |
|---|---|---|---|---|
| 10,791,021 | B1 * | 9/2020 | Sharma | G06F 16/951 |
| 10,853,062 | B1 * | 12/2020 | Holt | G06F 8/38 |
| 10,872,029 | B1 | 12/2020 | Bawcom | |
| 11,099,976 | B2 | 8/2021 | Khakare et al. | |
| 11,556,238 | B1 | 1/2023 | Kairali et al. | |
| 2022/0247769 | A1 | 8/2022 | Erlingsson et al. | |
| 2023/0075183 | A1 | 3/2023 | Copty et al. | |
| 2023/0344781 | A1 * | 10/2023 | Nalam | H04L 47/803 |

OTHER PUBLICATIONS

Soares et al., Matching the Blanks: Distributional Similarity for Relation Learning, Jun. 7, 2019.
Github, Infrastructure as code generator—from visual diagrams to Terraform, 2023, https://github.com/antonbabenko/modules.tf-lambda.
Github, IBM Cloud—Terraform Provider IBM, 2023, https://github.com/IBM-Cloud/terraform-provider-IBM.
IBM, Watson Natural Language Understanding, 2023, https://www.ibm.com/demos/live/natural-language-understanding/self-service.

* cited by examiner

*Primary Examiner* — Hanh Thi-Minh Bui
(74) *Attorney, Agent, or Firm* — Steven M. Bouknight

(57) ABSTRACT

An embodiment performs, by an attribute value substitution engine, key-value extraction on infrastructure as code. The embodiment assigns, by the attribute value substitution engine, an attribute in a plurality of attributes to a value in the extracted key-value. The embodiment computes, by the attribute value substitution engine, a plurality of similarities between the plurality of attributes and a cloud resource. The embodiment groups, based on the plurality of similarities, the plurality of attributes into a group of attributes. The embodiment substitutes, by the attribute value substitution engine, the attribute with another attribute, the attribute and the another attribute belonging to the group of attributes.

16 Claims, 10 Drawing Sheets

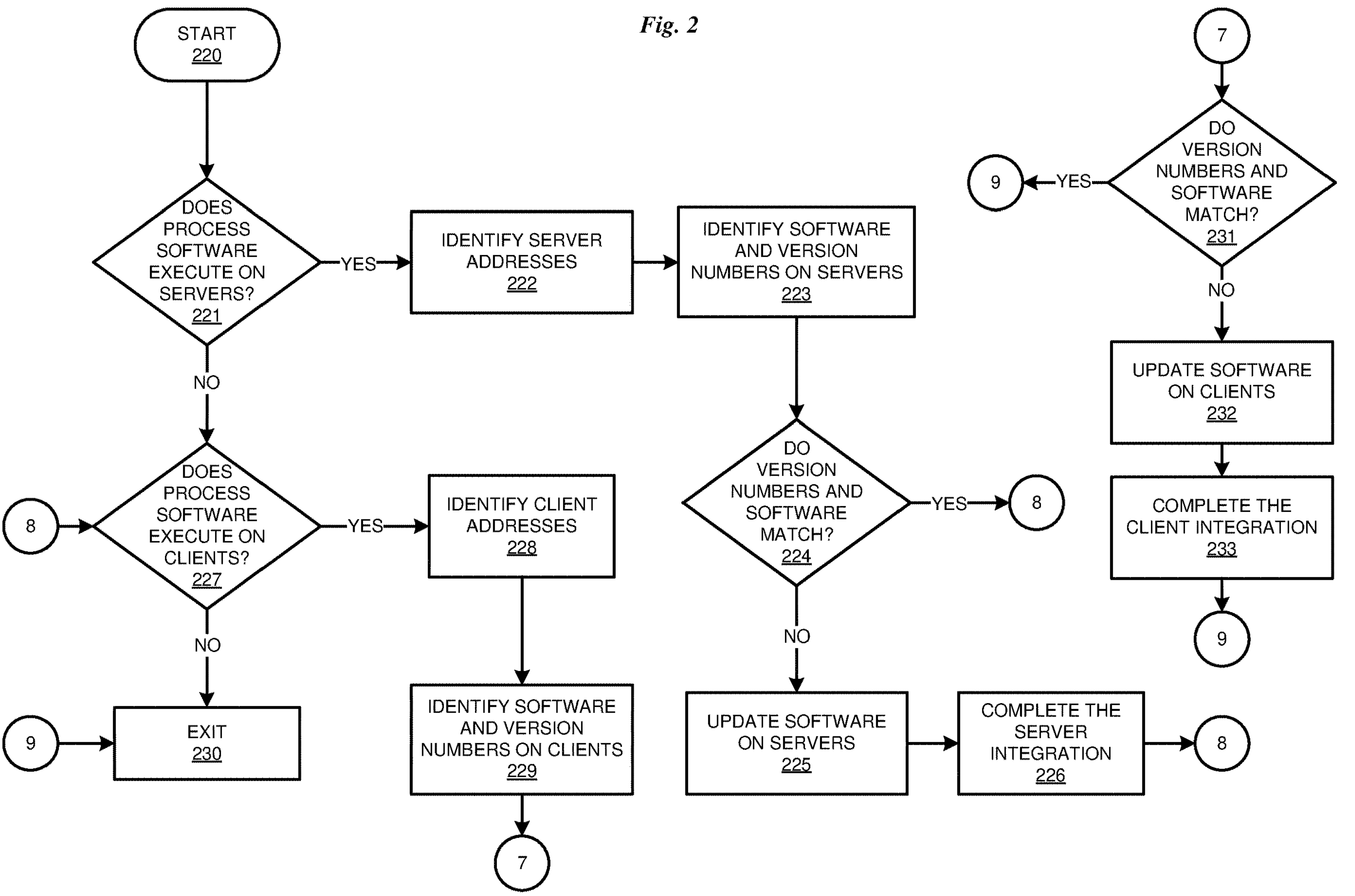
Fig. 2
START 220
DOES PROCESS SOFTWARE EXECUTE ON SERVERS? 221
YES
NO
IDENTIFY SERVER ADDRESSES 222
IDENTIFY SOFTWARE AND VERSION NUMBERS ON SERVERS 223
DO VERSION NUMBERS AND SOFTWARE MATCH? 224
YES
8
NO
UPDATE SOFTWARE ON SERVERS 225
COMPLETE THE SERVER INTEGRATION 226
8
8
DOES PROCESS SOFTWARE EXECUTE ON CLIENTS? 227
YES
NO
IDENTIFY CLIENT ADDRESSES 228
IDENTIFY SOFTWARE AND VERSION NUMBERS ON CLIENTS 229
7
9
EXIT 230
7
DO VERSION NUMBERS AND SOFTWARE MATCH? 231
YES
9
NO
UPDATE SOFTWARE ON CLIENTS 232
COMPLETE THE CLIENT INTEGRATION 233
9

400
CONTAINER CLUSTER
404
OBSERVABILITY
MONITORING INSTANCE
402

500

CLOUD
502
VPC NETWORK
504
CLASSIC NETWORK
506
TRANSIT GATEWAY
508
CLIENT VSI
510
PDNS
512
ZONE 1 514A
NODE 1
ZONE 1 NLB
ZONE 2 514B
NODE 2
ZONE 2 NLB
ZONE 3 514C
NODE 3
ZONE 3 NLB
DOCUMENT DATABASE
516

INTELLIGENT ATTRIBUTE VALUE SUBSTITUTION IN INFRASTRUCTURE AS CODE (IAC) GENERATION

BACKGROUND

The present invention relates generally to infrastructure as code. More particularly, the present invention relates to a method, system, and computer program for intelligent attribute value substitution in infrastructure as code generation.

Infrastructure as code (IaC) is a paradigm wherein computing infrastructure is provisioned and managed using code and software development techniques, rather than traditional information technology administration approaches. This code-driven method allows infrastructure to be automatically set up, modified, and managed through code files, akin to how software applications are developed and deployed. These IaC files describe the desired state of infrastructure elements, such as servers, storage, networks, and other information technology components. One of the primary benefits of IaC is consistency. When changes are made to the code, they can be deployed across environments uniformly, thus ensuring identical configurations throughout development, testing, and production stages. However, mastering the scripting language and syntax specific to each cloud provider can be a steep learning curve for developers. This is because each cloud provider often has its own set of tools and language constructs for defining and provisioning cloud resources.

SUMMARY

The illustrative embodiments provide for intelligent attribute value substitution in IaC generation.

An embodiment includes performing, by an attribute value substitution engine, key-value extraction on IaC. The process of performing key-value extraction on IaC plays a role in identifying the essential attributes for the generation of cloud infrastructure code. By extracting these key-values, the system can obtain a precise understanding of various parameters and attributes within the code. A technical advantage of this step lies in its ability to facilitate an automated and accurate extraction process, which serves as the foundation for intelligent attribute value substitution. This method may enhance the ability to identify relevant attributes and their associated values, leading to increased efficiency and accuracy in the IaC generation process.

The embodiment also includes assigning, by the attribute value substitution engine, an attribute in a plurality of attributes to a value in the extracted key-value. Assigning specific attributes to values in the extracted key-value set is a step in correlating the different elements of the IaC. A technical advantage of this assignment lies in the precise mapping between attributes and values, allowing for intelligent manipulation and substitution later in the process. This step may form a well-defined structure that is essential for effective IaC generation, enhancing consistency and reducing potential errors.

The embodiment also includes computing, by the attribute value substitution engine, a plurality of similarities between the plurality of attributes and a cloud resource. The process of computing similarities between attributes and cloud resources introduces a level of intelligence in understanding how different elements within the IaC are interconnected. A technical advantage of this computation lies in providing insight into the relationships and dependencies between attributes, allowing for more nuanced substitution decisions. This step may enhance the capability to align attributes effectively, contributing to more optimized IaC generation.

The embodiment also includes grouping, based on the plurality of similarities, the plurality of attributes into a group of attributes. Grouping attributes based on their similarities contributes to a more organized and streamlined structure within the IaC. A technical advantage of this step is the efficient handling of related attributes, which simplifies the substitution process. By understanding and grouping related attributes, the system can manage and substitute values with greater coherence and consistency, improving the overall quality of the IaC generation.

The embodiment also includes substituting, by the attribute value substitution engine, the attribute with another attribute, the attribute and the another attribute belonging to the group of attributes. The substitution of one attribute with another within a group is the culmination of the intelligent attribute value substitution process. A technical advantage of this step lies in its ability to dynamically adapt attributes according to specific requirements or changes. By allowing for flexible and intelligent substitution, this step helps ensure that the generated IaC can be tailored to different scenarios without losing its integrity or coherence.

The combined effect of these steps leads to a robust and intelligent system for attribute value substitution in IaC generation. The process of key-value extraction, precise attribute assignment, similarity computation, attribute grouping, and dynamic attribute substitution results in a method that can not only enhance the efficiency and accuracy of IaC generation but also introduce flexibility and adaptability. This overall approach contributes to the creation of more responsive and optimized IaC, improving the quality and effectiveness of the generated code for cloud infrastructure management. By focusing on intelligent attribute value substitution, it may enhance the adaptability and relevance of IaC, catering to diverse needs and scenarios in the rapidly evolving cloud environment.

An embodiment also includes determining, by the attribute value substitution engine based on a diagram associated with the IaC, a relationship between the cloud resource and another cloud resource in the diagram, the relationship having at least one of a parent-child relationship, a source-target relationship, and an overlap relationship. Determining relationships between cloud resources within the IaC is a sophisticated step that recognizes various types of relationships, such as parent-child, source-target, and overlap. A technical advantage of this step is in its ability to provide deeper insight into how cloud resources are interconnected. By understanding these relationships, the system can make more intelligent decisions during the substitution process, tailoring the IaC to better suit the underlying infrastructure's needs.

An embodiment also includes determining, by the attribute value substitution engine, a parent-child relationship between the cloud resource and another cloud resource; and substituting the attribute with the another attribute based on the parent-child relationship. This step focuses on identifying parent-child relationships between cloud resources and utilizing this understanding for attribute substitution. A technical advantage here is the increased precision in substitution, maintaining the hierarchical structure within the IaC. Such intelligent substitution supports the creation of a more coherent and functional IaC, preserving the essential dependencies and relationships in the generated code.

In an embodiment, the substituting the attribute with another attribute based on the parent-child relationship further may include substituting a first attribute associated with a child cloud resource with a second attribute associated with a parent cloud resource. This more specific substitution between child and parent cloud resources allows for an even more tailored approach. A technical advantage is in its precision, aligning with the natural hierarchy of the cloud resources, and ensuring that the substitutions made are contextually appropriate. This nuanced substitution enhances the coherence and functionality of the IaC.

An embodiment also includes determining, by the attribute value substitution engine, a source-target relationship between the cloud resource and another cloud resource; and substituting the attribute with the another attribute based on the source-target relationship. Identifying and substituting attributes based on source-target relationships within the cloud resources brings another layer of intelligence to the IaC generation. A technical advantage of this step is in its ability to reflect the directional dependencies within the infrastructure, ensuring that the substitutions align with the flow and interconnection of the resources. This contributes to a more efficient and realistic representation of the cloud infrastructure.

An embodiment also includes where the substituting the attribute with another attribute based on the source-target relationship further may include substituting a first attribute associated with a source cloud resource with a second attribute associated with a target cloud resource. This refinement in substitution based on source-target relationships brings greater accuracy and context-awareness to the IaC. A technical advantage is its ability to mirror the exact interactions and dependencies between source and target resources, enhancing the realism and functionality of the generated code.

In an embodiment, the attribute value substitution engine may include a machine learning model. The integration of a machine learning model within the attribute value substitution engine introduces a learning and adaptive aspect to the process. A technical advantage of using machine learning is the continuous improvement and adaptation of the system, enabling more precise and intelligent substitutions as the system encounters various IaC scrips.

In an embodiment, the machine learning model is configured to perform relationship prediction and sequence prediction from the IaC. Configuring the machine learning model for relationship and sequence prediction tailors its capabilities towards understanding the intricate connections within the IaC. A technical advantage here is the enhanced predictive ability of the system, allowing for proactive and more nuanced substitutions that align with the inherent structure of the cloud infrastructure.

An embodiment also includes training the machine learning model using a plurality of cloud resources; and training the machine learning model using a plurality of IaC scrips. Training the machine learning model with various cloud resources and IaC scrips adds to the adaptability and robustness of the system. A technical advantage of this approach is the creation of a model that can handle diverse and complex scenarios, improving the quality and applicability of the substitutions made.

These steps contribute to the creation of an advanced, intelligent attribute value substitution engine for IaC generation. By understanding and manipulating different types of relationships within the cloud resources, determining specific parent-child and source-target connections, and integrating machine learning for continuous learning and adaptation, this process leads to a significantly enhanced IaC generation method. A combined effect is a highly adaptable, precise, and intelligent system capable of creating tailored and realistic IaC, reflecting the intricate and diverse nature of cloud infrastructures. Through intelligent substitutions based on various relationships, machine learning integration, and targeted training, this invention offers a powerful tool for the modern cloud landscape, promoting efficiency, coherence, and adaptability in IaC generation.

An embodiment that includes determining a relationship between cloud resources based on a diagram, identifying parent-child and source-target relationships, and substituting attributes according to these relationships, where the attribute value substitution engine includes a machine learning model configured to perform relationship prediction. This embodiment may cause improved accuracy and adaptability in the IaC generation process. The integration of machine learning enhances the understanding of cloud resource relationships, ensuring intelligent and context-aware substitutions. The specific implementation of machine learning for relationship prediction may help ensure that substitutions align with the inherent structure of the cloud infrastructure, enabling continuous learning and refinement.

In an enterprise-level cloud environment, where various complex relationships between cloud resources need to be managed, this embodiment could provide an intelligent system to generate IaC. Through relationship predictions using machine learning, the system can adapt to different infrastructures and ensure that generated IaC reflects the real-world interconnections and dependencies between resources. This might significantly reduce manual errors and enhance efficiency in deploying and managing cloud infrastructure.

An embodiment that includes determining relationships between cloud resources, identifying parent-child and source-target relationships, substituting attributes based on these relationships, and training a machine learning model using various cloud resources and IaC scrips. This embodiment may lead to a more robust and versatile IaC generation system, capable of handling diverse and complex scenarios through its learning capabilities. Training the machine learning model with various cloud resources and IaC scrips creates a model that can adapt to a wide range of scenarios, improving the quality and applicability of substitutions.

In a scenario where an organization is managing multiple cloud environments with different architectures, this embodiment could serve as a universal tool for IaC generation. By training the machine learning model with various cloud resources and IaC scrips, the system can be versatile enough to handle different cloud structures. It might enable a consistent, intelligent approach to IaC generation across diverse platforms, leading to reduced complexity and increased agility in managing various cloud resources.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 2 depicts a block diagram of an example software integration process in accordance with an illustrative embodiment.

DETAILED DESCRIPTION

Figure 1:
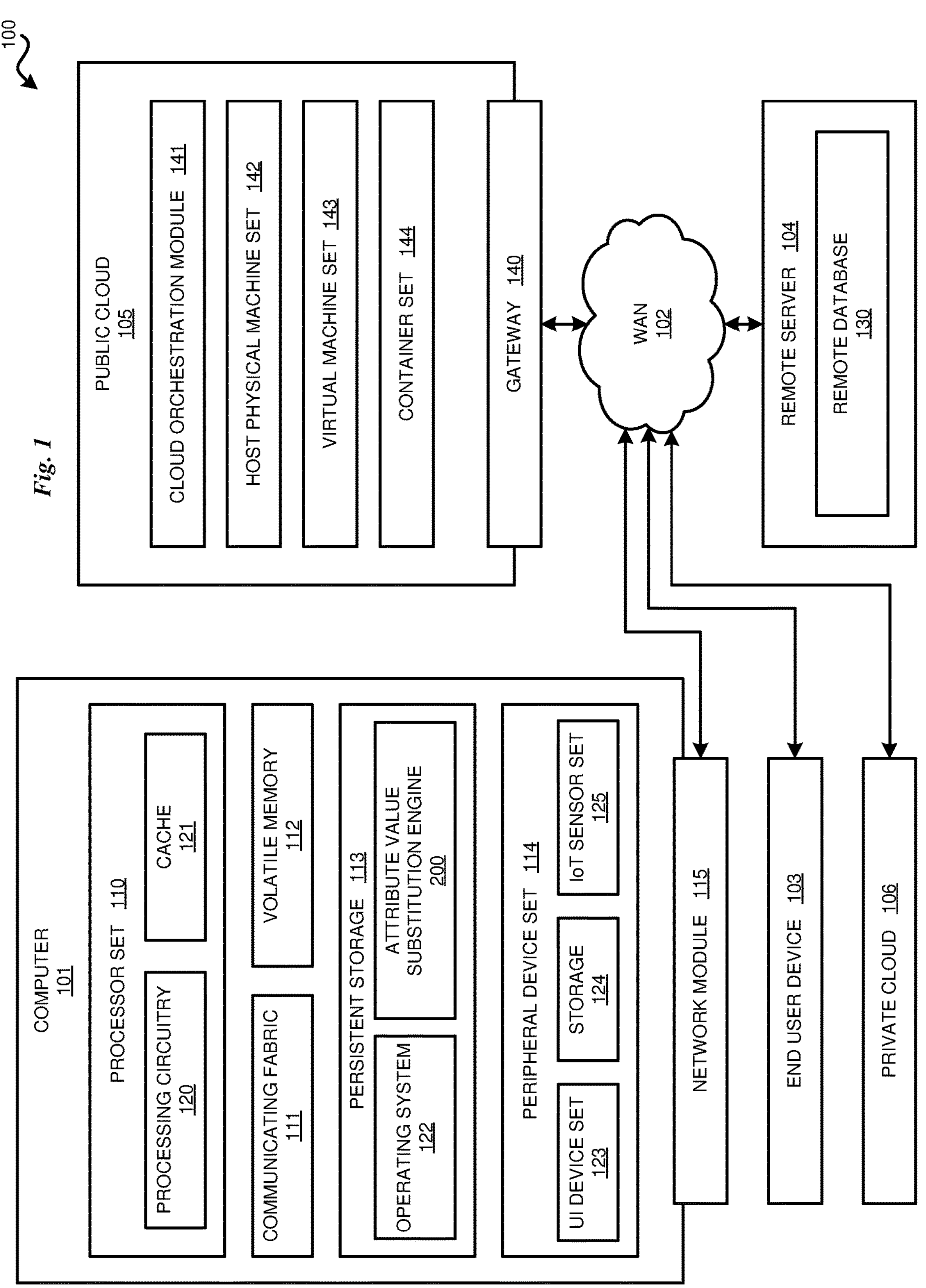
FIG. 1 depicts a block diagram of a computing environment in accordance with an illustrative embodiment.

Infrastructure as code (IaC) represents a significant shift in the way information technology operations are handled. Traditionally, setting up and managing information technology resources required manual processes and interventions, often leading to inconsistencies across environments. However, with IaC, the same discipline applied to application code development is introduced to infrastructure management. Infrastructure, in the form of servers, networks, storage devices, and more, can now be defined, provisioned, and managed using code. This means that information technology setups can be versioned, tracked, and replicated reliably across different stages, be it development, staging, or production.

Cloud providers have become central to the modern technological landscape. With offerings ranging from virtual machines to database services and machine learning platforms, they offer a plethora of services that can be provisioned on demand. Companies have developed their own set of tools and frameworks to support IaC on their platforms. These tools, while powerful, often come with their own unique syntax and operational nuances. Developers and information technology professionals have to familiarize themselves with these specifics if they intend to leverage the full potential of cloud services effectively and efficiently.

For developers who are already juggling application development, diving deep into the intricacies of IaC scripts can be daunting. Writing extensive scripts for cloud deployments, especially for complex architectures, demands a considerable amount of time and expertise. Mistakes, no matter how minor, in these scripts can cause disruptions in service, security vulnerabilities, or financial costs. This steep learning curve and the potential for errors puts immense pressure on developers. Given the complexities surrounding IaC and cloud-specific syntax, there is a growing demand for more intuitive methods of defining and managing cloud architectures.

Existing systems often rely heavily on manual attribute mapping. When creating a cloud architecture using these methods, users are required to specify explicitly the relationships and dependencies between different resources within the architecture diagram. This process can be cumbersome and prone to errors, particularly when the architecture becomes complex. Furthermore, most existing systems mandate that users input all attributes in the architecture diagram before generating IaC. This not only makes the process tedious but also places the onus on the user to ensure that every attribute is defined correctly. It can increase the possibility of misconfigurations, especially if the user is not deeply familiar with all the intricacies of the cloud platform in use.

The present disclosure addresses the deficiencies described above by providing a process (as well as a system, method, machine-readable medium, etc.) that intelligently transforms IaC by recognizing and mapping relationships between resources. This process may enable users to create a cloud architecture diagram utilizing their domain knowledge, subsequently filling in the required attributes for each object. The system may leverage machine learning techniques, such as natural language processing techniques, to extract and substitute attribute values based on identified relationships like parent-child, source-target, and overlaps between them. Furthermore, the system may facilitate provider-agnostic conversion of diagrams into deployable IaC, streamlining the process of generating consistent and reliable scripts for cloud resource provisioning.

Illustrative embodiments provide for intelligent attribute value substitution in IaC generation. Attribute value substitution may involve the process of replacing specific attributes within an IaC script or configuration with corresponding values that suit the specific environment or context. This could be tailored to different cloud providers or configurations, ensuring seamless deployment and management. For example, in the case of deploying a virtual machine in various cloud environments, attribute value substitution may automatically adjust parameters like virtual machine size, network configurations, or security settings, to align with the specific cloud provider's requirements. In some embodiments, for instance, attribute value substitution may be used to automatically replace attributes like variables or parameters within an IaC script with corresponding values. This might include things like server sizes, internet protocol (IP) addresses, or region-specific configurations. For instance, in a Terraform script, a developer might use variables to define instance sizes, which could then be substituted with actual values like "t2.micro" or "m5.large" depending on the specific deployment. Intelligent attribute value substitution may take this further by considering the broader context, such as the cloud provider or the compliance requirements, automatically adjusting these values for optimal performance, cost-efficiency, or adherence to policies, among others. For example, attribute value substitution could identify the most cost-effective virtual machine size based on the application's current workload and the cloud provider's pricing structure.

"IaC generation," as used herein, may refer to the process of creating, organizing, or managing code that defines the infrastructure of a computing environment. This code, which may represent the blueprints of the infrastructure, can be versioned and stored, allowing for automated and consistent deployment across different environments. For example, IaC generation might include the creation of Terraform or Ansible scripts to instantiate cloud resources like computer instances, databases, or networking components, ensuring that the environment is replicated accurately and efficiently. In some embodiments, for instance, IaC generation may involve the process of creating code that automates the provisioning and management of information technology infrastructure. This code, which may be written in languages like Terraform, Ansible, or Chef, may serve as a blueprint for the entire infrastructure, allowing for consistent, repeatable deployments across different environments. It may embody best practices and architectural decisions, and can also be integrated with version control systems, facilitating collaboration and continuous integration/continuous deployment pipelines.

An intelligent attribute value substitution may involve leveraging machine learning or algorithmic methods to understand the structure and dependencies within the IaC, enabling dynamic and context-aware substitution of attribute values. For example, an intelligent substitution might recognize that a specific database configuration in one cloud provider must be altered in specific ways to be compatible with another provider, automating these changes without manual intervention. In some embodiments, for instance, an intelligent attribute value substitution may take this process further by employing algorithms or machine learning to make context-aware decisions about attribute substitutions. It could consider factors such as existing infrastructure, cost limitations, performance needs, and even regulatory requirements. For example, an intelligent system might recognize that a specific application must adhere to General Data Protection Regulation (GDPR) regulations, and therefore automatically select a European data center for deployment, adjust security settings to meet compliance standards, or choose specific storage classes that align with data retention policies, among other modifications.

Illustrative embodiments provide for use of an attribute value substitution engine. An "attribute value substitution engine," as used herein, may refer to a specialized software component designed to perform intelligent substitutions within IaC. For example, this engine might utilize predefined rules, machine learning models, or both, to analyze IaC scripts and perform necessary substitutions to align with particular cloud environments or other specified constraints. In some embodiments, for instance, this engine might integrate with existing IaC tools, or be part of a broader orchestration platform. It could rely on rule-based logic, machine learning models, or a combination of both, analyzing IaC scripts and/or diagrams, making necessary adjustments based on a vast array of contextual inputs. For example, the engine might interact with a cloud provider's environment, automatically identifying available instance types, current pricing, known best practices, or organizational policies to dynamically adjust an instance configuration within a Terraform script, ensuring optimal deployment without manual oversight.

In some embodiments, the attribute value substitution engine may comprise a machine learning model. A "machine learning model," as used herein, may refer to a computational algorithm trained to identify patterns, relationships, and dependencies within data. For example, in the context of IaC, a machine learning model might analyze the relationships between different cloud resources, such as a database and its associated storage, and predict or suggest appropriate configurations. In some embodiments, for instance, the attribute value substitution engine might include a machine learning model employing techniques like supervised learning or reinforcement learning. This model could be trained on historical IaC deployments, infrastructure diagrams, or real-time monitoring data to recognize patterns and make intelligent substitution decisions. For example, a model might be trained using reinforcement learning on a set of Terraform scripts, with rewards provided for cost savings, performance improvements, or compliance adherence. Over time, the model may learn to make increasingly effective decisions, such as selecting optimal storage classes or configuring auto-scaling parameters.

In some embodiments, the machine learning model may be configured to perform relationship prediction and sequence prediction from the IaC. "Relationship prediction," as used herein, may refer to the ability to determine the structural or functional interconnections between different cloud resources. For example, the model might identify that a specific database is the primary data store for a web application server, thus defining a source-target relationship. "Sequence prediction." as used herein, may refer to predicting the order of resource instantiation or determining the sequence of operations in an IaC script, ensuring the correct dependencies and execution order. For example, sequence prediction might ensure that network configurations are established before initializing a virtual machine, preventing script failure due to incorrect sequencing.

In some embodiments, for instance, relationship prediction may involve understanding how various components of an infrastructure are interconnected, while sequence prediction focuses on the correct order of operations in deploying or modifying resources. For example, relationship prediction might identify that a specific subnet must be associated with a particular security group, while sequence prediction ensures that the security group is created before the subnet. This process could prevent a common issue where incorrect sequencing leads to script failures, improving efficiency and robustness in deployments. This process may involve understanding dependencies between resources, ensuring that they are created, modified, or destroyed in the correct order to prevent errors or inefficiencies. For example, in a complex cloud infrastructure with nested dependencies, sequence prediction would ensure that a virtual private cloud is created before subnets, subnets before instances, and instances before application deployment. A deviation from this sequence could lead to failures, and intelligent sequence prediction can automate this complex orchestration.

Training a machine learning model to perform relationship prediction and sequence prediction may involve feeding it with historical data, diagrams, or scripts, and using algorithms to understand and learn the underlying patterns and sequences in IaC scrips. For example, this might include training the model using data curated from different cloud providers' infrastructure patterns. In some embodiments, for instance, training a machine learning model for relationship and sequence prediction might involve preprocessing and feature engineering, using historical IaC scripts, infrastructure diagrams, or logs. The model might employ techniques like graph neural networks (GNN) or recurrent neural networks (RNN) to capture the complex interrelationships and sequencing within infrastructure code. For example, training an RNN on a dataset of successful Kubernetes deployments might enable it to understand the precise order in which pods, services, and ingress controllers must be instantiated, optimized for different cloud providers or hardware configurations.

In some embodiment, for example, the machine learning model may be trained using a plurality of cloud resources, which may be associated with a plurality of cloud providers. This process may involve collecting and processing data from various cloud environments, ensuring the model's ability to generalize and adapt to different providers. For example, the training might involve using technical data or IaC associated with different cloud providers, enabling the model to understand and work across these different platforms. This process may help ensure a broad understanding of different cloud architectures, pricing models, availability zones, and more, making the model more versatile and effective across different cloud environments. For example, training on multiple cloud provider's load balancing architectures may enable the model to translate concepts and configurations between these platforms.

Additionally and alternatively, the machine learning model may be trained using a plurality of IaC scrips. This process may involve ingesting various IaC scripts, diagrams, and configurations, and learning the underlying structures, relationships, and sequencing. For example, the model might be trained on Terraform scripts for virtual private clouds, Kubernetes configurations for container orchestration, or scripts for automated provisioning, among others, allowing it to handle a diverse range of IaC scenarios and complexities. This process may facilitate understanding and optimizing a wide range of infrastructure code, from simple single-server setups to complex microservices architectures. For example, the model might be trained on Terraform scripts defining one cloud provider's functions, another cloud provider's playbooks for on-premises server provisioning, and another cloud provider's charts for Kubernetes orchestration, allowing it to provide intelligent attribute value substitution across all these contexts, maximizing efficiency, compliance, and performance.

Illustrative embodiments provide for performing key-value extraction on IaC. "Key-value extraction," as used herein, may refer to the process of identifying and extracting specific pairs of keys and values within IaC scripts or configurations, where a key is an identifier or attribute name, and the value is the corresponding setting or parameter. For example, in a Terraform script, the key might represent a property such as "instance_type," and the value might be "t2.micro," indicating the type of virtual machine to be deployed. In some embodiments, for instance, this extraction may be helpful for interpreting and manipulating the configuration data within IaC files, such as YAML, JavaScript Object Notation (JSON), or HashiCorp Configuration Language (HCL), allowing for more efficient automation and customization of cloud resources. This extraction can allow for the automation of repetitive tasks, the validation of configurations against specific constraints, or the transformation of IaC scripts to match different environments or platforms.

Performing key-value extraction on IaC may involve parsing the IaC scripts, recognizing patterns or structures that define key-value pairs, and extracting them for further processing or manipulation. For example, this could involve using regular expressions or other pattern-matching techniques to identify and extract all key-value pairs related to network configuration from a set of IaC scripts. In some embodiments, for instance, various parsing techniques may be employed, such as lexical analysis, syntax parsing, or using specialized libraries that understand the specific IaC language. This can facilitate validation, transformation, or interpretation of the scripts. For example, regular expressions or other pattern-matching techniques may be used to identify and extract all key-value pairs related to network configuration from a set of IaC scripts. This targeted extraction may enable granular control and customization, ensuring that specific attributes such as firewall rules, IP address ranges, or domain name system (DNS) settings can be precisely controlled, validated, or manipulated.

Illustrative embodiments provide for assigning an attribute in a plurality of attributes to a value in the extracted key-value. An "attribute," as used herein, may refer to a specific property or characteristic defined in the IaC that can be adjusted, such as a memory size, storage type, or security setting. For example, an attribute might be the network configuration settings within a cloud infrastructure described by IaC. This concept of attributes may allow for a modular and reusable design, where common attributes can be defined once and referenced or overridden in various parts of the IaC scripts. For example, an attribute might be the network configuration settings within a cloud infrastructure described by IaC. Assigning specific values to these attributes may enable standardized configurations, ensuring consistency across different environments and facilitating compliance with organizational policies or industry regulations.

A "value," as used herein, may refer to a specific setting or parameter assigned to an attribute, defining how that attribute should behave or be configured. These values might be hard-coded, dynamically generated, or derived from external sources such as environment variables or secret management systems. For example, a value might be a specific encryption method to be applied to data storage in a cloud environment. This value could be chosen based on performance considerations, compliance requirements, or compatibility with specific systems or services within the cloud environment.

Assigning an attribute to a value may involve linking a recognized attribute with a corresponding value from the extracted key-value pairs, potentially making adjustments or transformations to align with specific needs or standards. For example, this might include converting a generic storage size attribute into provider-specific configurations, based on the targeted cloud provider. In some embodiments, for instance, this assignment may involve validation, transformation, or interpolation processes to align with specific needs or standards. The complexity of this process may vary based on the IaC language used, the underlying cloud provider, or the specific requirements of the application or system being deployed. For example, converting a generic storage size attribute into provider-specific configurations might include determining the optimal storage type and provisioning options for the targeted cloud provider.

Illustrative embodiments provide for computing a plurality of similarities between the plurality of attributes and a cloud resource. A "cloud resource," as used herein, may refer to a virtualized component within a cloud environment, such as a compute instance, storage bucket, or networking device. In some embodiments, for instance, matching attributes with the appropriate cloud resources may allow for a more accurate translation of IaC scripts into the underlying cloud platform, optimizing performance, cost, and reliability. Identifying the similarity between an attribute like storage configuration and specific cloud resources may enable intelligent provisioning, maximizing the utilization of cloud resources and aligning with best practices or specific business objectives.

A "similarity," as used herein, may refer to a measure or metric indicating how closely an attribute or set of attributes aligns with a specific cloud resource or another attribute, based on predefined criteria or learned patterns. For example, similarity might be measured by comparing an attribute's settings to known configurations for specific cloud resources, or by using machine learning models to identify structural or functional alignment. In some embodiments, for instance, various mathematical models, statistical methods, or machine learning algorithms might be employed to compute these similarities, including cosine similarity, Euclidean distance, or deep learning models that have been trained on specific patterns within IaC scripts. For example, similarity might be measured by comparing an attribute's settings to known configurations for specific cloud resources, like matching a desired instance type with available options within a cloud provider. This process could be further augmented with machine learning models to identify structural or functional alignment, enabling more intelligent and adaptive IaC management.

Computing a similarity between an attribute and a cloud resource may involve using algorithms, statistical methods, or machine learning techniques to analyze and compare the structure, function, or other characteristics of the attribute and cloud resource. For example, this process might include applying cosine similarity measures to vectorized representations of attributes and cloud resources to determine how closely they match. This computation can lead to intelligent decisions about resource provisioning, scaling, or adaptation based on the specific needs and constraints of the application or system being deployed. For example, applying cosine similarity measures to vectorized representations of attributes and cloud resources might determine how closely they match. This similarity measure could inform the system to automatically adjust configurations to achieve better performance, lower cost, or improved security, all without manual intervention.

Illustrative embodiments provide for grouping the plurality of attributes into a group of attributes. A "group of attributes," as used herein, may refer to a collection or cluster of related attributes that are organized together based on specific criteria, such as function, dependency, or similarity. For example, attributes related to networking, such as IP configurations, subnet settings, and firewall rules, might be grouped together. Grouping related attributes together may allow for more structured and maintainable IaC, facilitating collaboration, versioning, and reuse across different projects or teams. These groups might be formed based on functional areas, dependencies, or similarities in the attributes, such as all attributes related to storage or networking.

Grouping the plurality of attributes into a group of attributes may involve applying clustering algorithms or other organizational methods to sort and categorize attributes into logical collections. For example, hierarchical clustering might be used to group attributes based on their similarities and relationships, creating a structured representation of the IaC. In some embodiments, for instance, various techniques such as k-means clustering, hierarchical clustering, or manual categorization based on expert knowledge might be employed, each with its benefits and considerations depending on the specific needs and complexity of the IaC. For example, hierarchical clustering might be used to group attributes based on their similarities and relationships, creating a tree-like structure that reflects the natural organization of the attributes within the IaC. This structured representation may support more intuitive navigation, understanding, and manipulation of the IaC.

Illustrative embodiments provide for substituting the attribute with another attribute. Substituting the attribute with another attribute may involve replacing one attribute with a different but related or equivalent attribute, either manually or through automated means, such as to optimize, standardize, or otherwise adjust the IaC. For example, this substitution might include replacing a deprecated storage configuration attribute with a newer, more efficient one, ensuring that the IaC remains up-to-date and compliant with current standards. This substitution process may enable flexibility and adaptability in IaC, allowing attributes to be replaced or overridden based on specific requirements, constraints, or changes in the underlying technology or environment. These substitutions might be guided by rules, policies, or algorithms that determine the most appropriate replacements or adjustments.

In some embodiments, the attribute and the another attribute may belong to the group of attributes. This process may help ensure that the substitution maintains coherence and consistency within the IaC's structure and function. This might be important when attributes are interconnected or dependent on one another, so that substitutions are made with proper awareness of these relationships. For example, careful consideration of interdependencies and context may be helpful when making substitutions, as changes to one attribute might impact others. This might involve using dependency analysis, semantic understanding, or specialized tools that recognize and handle these relationships, preserving the integrity and correctness of the IaC.

Illustrative embodiments provide for determining a relationship between the cloud resource and another cloud resource. A "relationship." as used herein, may refer to a specific connection, linkage, or interaction between two or more cloud resources within an infrastructure. This can encompass dependencies, hierarchies, or other types of connections that define how the resources interact or relate to each other. For example, a relationship might be a dependency where a virtual machine relies on a specific storage volume, or a hierarchy where a network is divided into subnets and zones. In some embodiments, for instance, these relationships may be expressed in IaC scripts using specific programming constructs or declarative syntax, often using tools like Terraform, Ansible, or Kubernetes. For example, in a Kubernetes environment, a pod might have a dependency on a specific ConfigMap or Secret. Alternatively, a relationship might represent a hierarchy where a network is divided into subnets and zones, structured using virtual private clouds and subnets. In some embodiments, for instance, determining a relationship between the cloud resource and another cloud resource may involve analyzing the configuration, properties, or interactions of the resources within the IaC, potentially using algorithms or models that recognize patterns or structures indicative of specific relationships. For example, this might include parsing the IaC scripts to identify resource dependencies by looking for references between resources, or applying graph theory techniques to model the relationship structures. For example, this process might include parsing the IaC scripts using custom scripts or specialized tools (e.g., AWS Config) to identify resource dependencies by looking for references between resources, or applying graph theory techniques to model relationship structures within a complex cloud environment.

In some embodiments, the relationship may comprise at least one of a parent-child relationship, a source-target relationship, and an overlap relationship. A "parent-child relationship," as used herein, may refer to a hierarchical linkage where one resource (the parent) contains or controls another (the child), with specific roles or responsibilities defined by this hierarchy. For example, a region could be the parent entity that houses multiple components like virtual private clouds, subnet access control lists, and security groups. Moving further down the hierarchy, virtual private clouds may house sub-components like subnets, designating a nested parent-child dynamic. IaC, such as Terraform, may define this relationship, with attributes of the parent being available to its child resources.

A "source-target relationship," as used herein, may refer to a directional connection where one resource (the source) sends data, requests, or other interactions to another resource (the target), defining a flow or pathway within the system. For example, an observability monitoring instance may act as the source, overseeing various cloud resources, and a container cluster may act as the target being monitored. IaC can represent this relationship, allowing for automatic derivation and filling of necessary attributes, ensuring coherent and efficient configuration.

An "overlap relationship," as used herein, may refer to a connection involving both parent-child and source-target relationships. For example, a cloud environment might serve as a comprehensive digital ecosystem housing virtual private clouds, classic networks, and transit gateways. These entities might have various parent-child and reciprocal source-target relationships, such as virtual private clouds having relationships with client virtual server instances and private domain name systems.

In some embodiments, the relationship may be determined based on a diagram associated with the IaC. This process may involve analyzing a visual representation or schematic of the IaC, where the resources and their relationships may be depicted graphically, allowing for intuitive recognition or modeling of the relationships. For example, this process might include analyzing a topology diagram that maps out the cloud infrastructure, identifying connections, hierarchies, and other relationships between the resources, providing a comprehensive view of how the system is structured and operates. This approach can facilitate understanding and management of the IaC, supporting effective design, optimization, and troubleshooting of the cloud environment. In some embodiments, for instance, this process may involve analyzing a visual representation or schematic, like a draw.io diagram or a network topology map, where the resources and their relationships are depicted graphically. For example, this might include analyzing a topology diagram created with tools like draw.io that maps out the cloud infrastructure, identifying connections, hierarchies, and other relationships between resources. This approach can support the design phase, where architects visually conceptualize the layout and interactions within the cloud environment, or the documentation phase, where current state diagrams support ongoing maintenance and future enhancements.

Illustrative embodiments provide for determining a parent-child relationship between the cloud resource and another cloud resource, and substituting the attribute with the another attribute based on the parent-child relationship. This process may involve analyzing the cloud resources' configurations, understanding the hierarchical dependencies, and applying specific logic or rules to substitute one attribute with another, considering the nature of the parent-child relationship. For example, if a virtual machine (child) is hosted within a particular cloud network (parent), a security policy attribute of the network may be substituted into the virtual machine's configuration to ensure consistent security enforcement. In some embodiments, for instance, these substitutions might be guided by predefined templates or models that are aligned with industry standards and best practices. For example, if a virtual machine (child) is hosted within a particular cloud network (parent), a security policy attribute of the network, such as firewall rules or intrusion detection mechanisms, may be substituted into the virtual machine's configuration. This ensures consistent security enforcement across all child resources within the parent, maintaining a coherent security posture and facilitating compliance with regulatory requirements.

In some embodiments, substituting the attribute with another attribute based on the parent-child relationship may comprise substituting a first attribute associated with a child cloud resource with a second attribute associated with a parent cloud resource. This process may involve identifying the specific attributes that define the relationship, and making appropriate substitutions that reflect the hierarchical dependencies or shared characteristics between the parent and child. For example, a child resource like a subnet may inherit a network access attribute from its parent resource, a virtual network, to maintain a coherent network architecture. In some embodiments, for instance, this process may involve dynamic mapping, data mining techniques, or machine learning models to identify the specific attributes that define the relationship and make appropriate substitutions.

A "child cloud resource," as used herein, may refer to a resource that is dependent on, controlled by, or contained within another resource (the parent), with specific attributes or functions that are influenced by that parent. For example, a virtual machine within a cluster, a subnet within a network, or a database within a database server could all be considered child resources, each inheriting specific attributes like security settings, network configurations, or performance constraints from their respective parents.

A "parent cloud resource," as used herein, may refer to a resource that holds, controls, or influences one or more other resources (the children), defining certain attributes, characteristics, or behaviors that may be shared or inherited by the child resources. Parents might include virtualized infrastructure like hypervisors controlling virtual machines, cloud networks encompassing subnets, or orchestration managers supervising containerized applications. For example, a virtual network containing subnets, a cluster hosting virtual machines, or a server running multiple applications might be considered parent resources, imparting attributes like bandwidth limits, virtualized hardware resources, or shared libraries across their child resources.

Illustrative embodiments provide for determining, by the attribute value substitution engine, a source-target relationship between the cloud resource and another cloud resource, and substituting the attribute with the another attribute based on the source-target relationship. This process may involve identifying the directionality and nature of interactions between the source and target resources, and making substitutions that reflect or accommodate those interactions. In some embodiments, for instance, this process may involve complex analysis using natural language processing, graph algorithms, or deep learning to identify the directionality and nature of interactions between source and target resources. Substitutions might be made to reflect or accommodate these interactions, optimizing the flow of data, enhancing performance, or improving security alignment between the connected resources. For example, a monitoring attribute in a source resource like an application server might be substituted with a corresponding logging attribute in a target resource like a centralized logging server, ensuring that logs are collected and processed in a unified manner.

In some embodiments, substituting the attribute with another attribute based on the source-target relationship may comprise substituting a first attribute associated with a source cloud resource with a second attribute associated with a target cloud resource. This process may involve understanding the flow or exchange between the source and target, and applying substitutions that support or optimize that relationship. In some embodiments, for instance, this process may involve adaptive mapping techniques, machine learning-based classifiers, or real-time transformation engines that support or optimize the relationship between the connected resources, enhancing interoperability and efficiency. For example, a performance metric attribute in a source resource like a web server might be substituted with a corresponding metric in a target resource like a database, reflecting the flow of data or requests between them. This could involve converting data formats, aligning query structures, or adjusting sampling intervals to ensure a smooth and coherent integration between the two components.

A "source cloud resource," as used herein, may refer to a cloud resource that initiates, sends, or transmits data, requests, or interactions to another resource (the target), defining a starting point or origin in a directional relationship. Sources might include application programming interface (API) endpoints, data producers, or application servers that generate and send information to other components within a distributed system. For example, a client application requesting data, a server sending updates, or a sensor transmitting readings might be considered source resources, each utilizing specific attributes like authentication tokens, data encryption methods, or transmission protocols to ensure secure and efficient communication with target resources.

A "target cloud resource," as used herein, may refer to a cloud resource that receives, accepts, or responds to data, requests, or interactions from another resource (the source), defining an endpoint or destination in a directional relationship. Targets might include data stores, logging systems, or application components that process and respond to incoming information. For example, a database serving queries, an update server accepting patches, or a control system receiving commands might be considered target resources, each requiring attributes like access controls, data validation mechanisms, or response formats to interact with source resources appropriately. These configurations might be dynamically adjusted or substituted to ensure compatibility, performance, and security within the system.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The process software for intelligent attribute value substitution in IaC generation is integrated into a client, server and network environment, by providing for the process software to coexist with applications, operating systems and network operating systems software and then installing the process software on the clients and servers in the environment where the process software will function.

The integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

With reference to FIG. 1, this figure depicts a block diagram of a computing environment 100. Computing environment 100 contains an example of an environment for the execution of at least some of the computer code involved in performing the inventive methods, such as attribute value substitution engine 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

With reference to FIG. 2, this figure depicts a block diagram of an example software integration process, which various illustrative embodiments may implement. Step 220 begins the integration of the process software. An initial step is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications, and NOS that have been tested with the process software (224). If all of the versions match and there is no missing required software, the integration continues (227).

If one or more of the version numbers do not match, then the unmatched versions are updated on the server or servers with the correct versions (225). Additionally, if there is missing required software, then it is updated on the server or servers (225). The server integration is completed by installing the process software (226).

Step 227 (which follows 221, 224 or 226) determines if there are any programs of the process software that will execute on the clients. If no process software programs execute on the clients, the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made if the version numbers match the version numbers of OS, applications, and NOS that have been tested with the process software (231). If all of the versions match and there is no missing required software, then the integration proceeds to 230 and exits.

If one or more of the version numbers do not match, then the unmatched versions are updated on the clients with the correct versions 232. In addition, if there is missing required software, then it is updated on the clients 232. The client integration is completed by installing the process software on the clients 233. The integration proceeds to 230 and exits.

Figure 3:
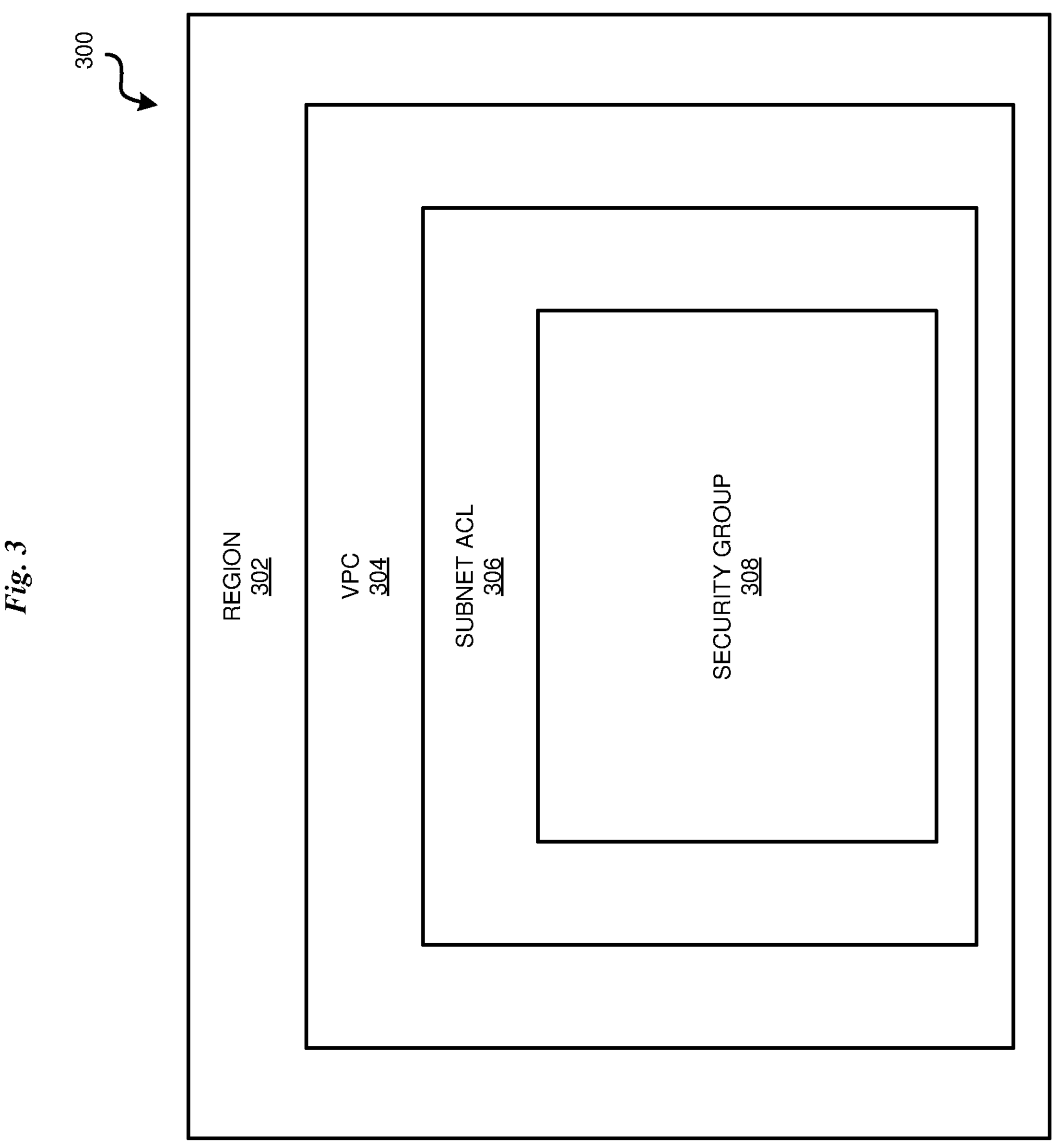
FIG. 3 depicts a block diagram of an example parent-child diagram in accordance with an illustrative embodiment.

With reference to FIG. 3, this figure depicts a block diagram of an example parent-child diagram 300. In the depicted example, parent-child diagram 300 comprises region 302, virtual private cloud (VPC) 304, subnet access control list (ACL) 306, and security group 308. It is to be understood that a parent-child diagram may comprise additional, fewer, or different components than those shown in the illustrative embodiment.

A parent-child relationship may represent an indication of nesting or containment, wherein one component exists within the confines of another. The attributes or characteristics of the parent may be available to its child resources, enabling a flow of information and properties down the hierarchy.

To illustrate, consider the concept of a region in cloud architectures, as shown in the depicted example. A region, such as region 302, typically denoting a geographical area, can house multiple components within it, making it a parent entity. For example, a virtual private cloud, such as virtual private cloud 304, may be located inside region 302, thereby designating region 302 as its parent and virtual private cloud 304 as its child. A virtual private cloud may offer an isolated network environment within a cloud setup.

Moving further down this hierarchy, there may be parent-child relationships between virtual private cloud 304 and its nested components. Within the boundaries of this virtual private cloud, other components may reside. For instance, virtual private cloud 304 may house other sub-components like subnet access control list 306, which may define and regulate traffic permissions for the various subnets that exist within virtual private cloud 304. This relationship reiterates the parent-child dynamics, with virtual private cloud 304 taking on the role of the parent and the subnet and virtual server instance being its respective children.

Nested within the boundaries of subnet access control list 306 may be a security group, such as security group 308 containing other components such as a virtual server instance (VSI), positioning the former as the parent and the latter as its child. A security group may function akin to a virtual firewall. Its primary role may be to oversee and manage the ingress and egress traffic for networked resources that are tied to it. Given its position in the hierarchy, it may abide by the rules and permissions set by its parent, subnet access control list 306.

This diagram may be associated with IaC. For example, IaC associated with this diagram, in the form of Terracode, may be as follows:

```
resource "vpc" "vpc1" {
  name = "vpc1"
}
resource "subnet" "subnet1" {
  name = "subnet123"
  vpc = vpc.vpc1.id
  ...
}
resource "security_group_rule" "sg-rule-inbound-ssh" {
  group = vpc.vpc1.default_security_group
  ...
}
resource "instance" "instance1" {
  name = "instance-name"
  vpc = vpc.vpc1.id
  ...
}
```

In the provided IaC for this scenario, there are placeholders for the virtual private cloud, zone, and subnet details. The system may be configured to identify this hierarchical structure and fill in the details for the virtual private cloud, zone, and subnet, using the parent attributes. For instance, the "vpc" placeholder in the subnet and virtual server instance resources may be automatically substituted with the reference to the created virtual private cloud.

Figure 4:
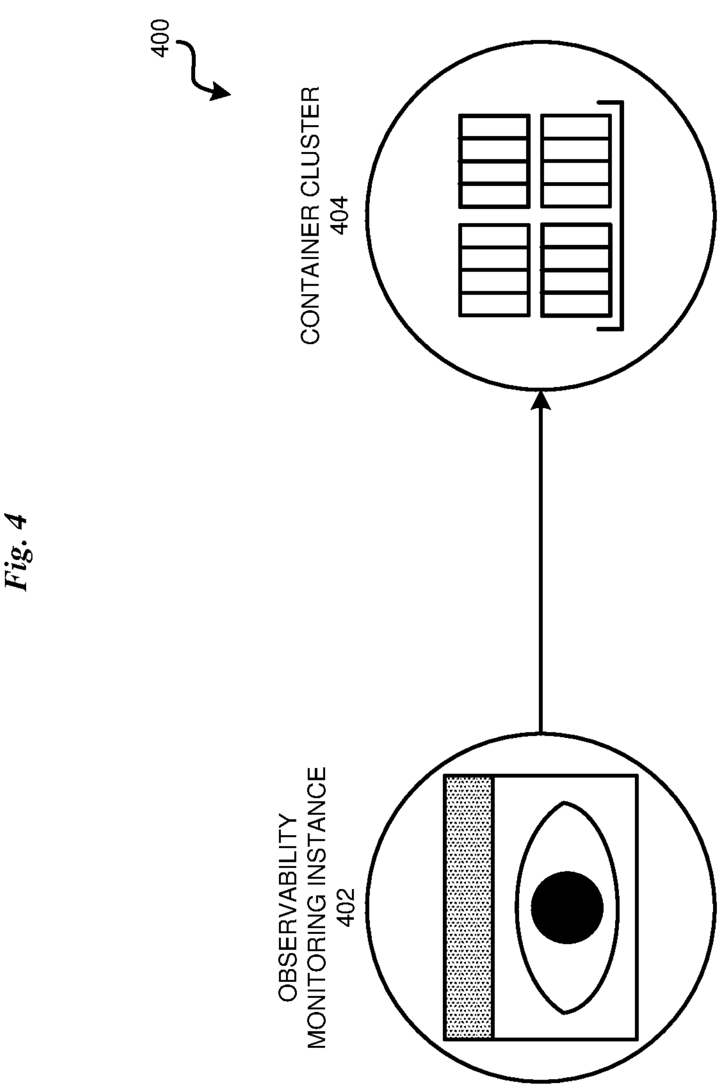
FIG. 4 depicts a block diagram of an example source-target diagram in accordance with an illustrative embodiment.

With reference to FIG. 4, this figure depicts a block diagram of an example source-target diagram 400. In the depicted example, source-target diagram 400 comprises observability monitoring instance 402 and container cluster 404. It is to be understood that a source-target diagram may comprise additional, fewer, or different components than those shown in the illustrative embodiment.

A source-target relationship may involve a dynamic wherein one component acts as a starting or originating point (the source) while the other acts as the end or the receiving point (the target). Such relationships may define data flow, dependencies, or operational hierarchies, among others.

Within this context, the observability monitoring instance 402, serving as the source, may represent a monitoring system or toolset that actively oversees and gauges the performance, health, and other metrics of various cloud resources. Its role may be to capture real-time data, analyze trends, and proactively send alerts when anomalies or threshold breaches occur.

On the other side of the relationship, the container cluster 404, designated as the target, could epitomize a collection of containers orchestrated to work together. Containers are lightweight, standalone, and executable software units that encapsulate a specific application and what it needs to run, such as runtime, system tools, and system libraries. When bundled into clusters, they streamline deployment, scaling, and management. As the target, the container cluster 404 might be the entity being monitored or acted upon by the source, in this case, the observability monitoring instance 402.

This source-target relationship diagram may be associated with IaC. For example, IaC in the form of Terracode may be as follows:

```
resource "monitoring" "monitoring_instance" {
  depends_on = [resource_key.monitoring_resourceKey]
  cluster = container_vpc_cluster.cluster1.id
  instance_id =
resource_instance.metrics_monitor_resource_instance.guid
}
```

In the example above, the attribute "cluster" for the monitoring resource may be determined by referencing the identifier of another resource, "container_vpc_cluster.cluster1." Because of the source-target relationship, the information from the "target" resource (container_vpc_cluster.cluster1) may be automatically used to fill in attributes for the "source" resource (monitoring.monitoring_instance). By harnessing such relationships, the system may automatically derive and fill in the necessary attributes. This ensures that the resulting infrastructure configuration is both coherent as resources are correctly linked, and efficient thus reducing the need for manual intervention.

Figure 5:
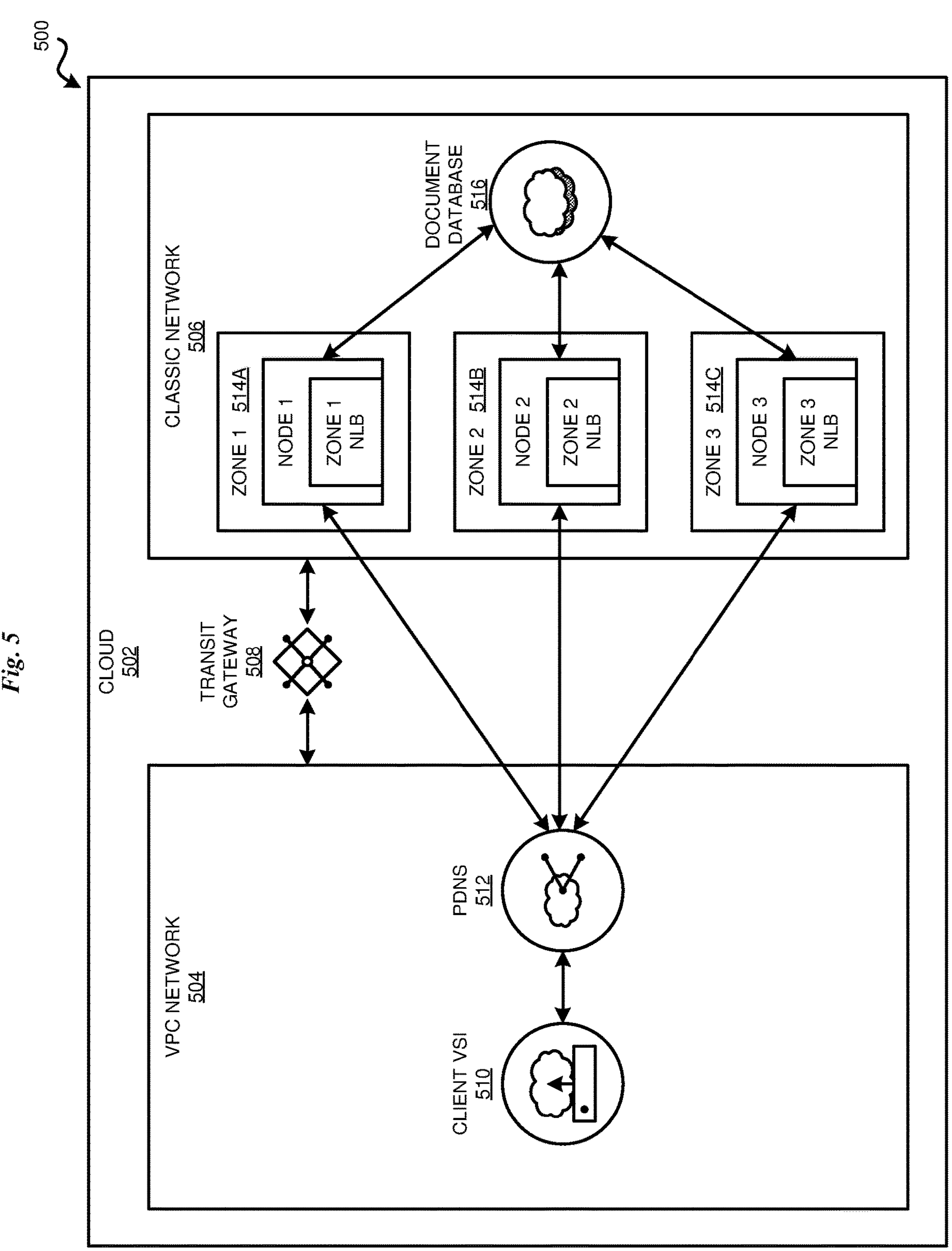
FIG. 5 depicts a block diagram of an example overlap diagram in accordance with an illustrative embodiment.

With reference to FIG. 5, this figure depicts a block diagram of an example overlap diagram 500. An overlap relationship may represent a combination of one or more child-parent relationships and one or more source-target relationships within a single diagram.

In the depicted example, overlap diagram 500 comprises cloud environment 502. Cloud environment 502 may serve as an environment for multiple connections and interactions in the overlap child-parent and source-target diagram 500. This cloud environment might represent a comprehensive digital ecosystem where data, applications, and services coexist and interact. Typically, such environments leverage scalable resources from multiple servers in a data center, providing users and organizations with the flexibility and scalability intrinsic to cloud computing. This may allow for resource optimization and integration of various network components, like virtual private cloud, classic networks, and transit gateways.

As shown, cloud environment 502 may have a parent-child relationship with virtual private cloud (VPC) network 504, classic network 506, and transit gateway 508. This relationship can be visualized as the cloud environment encapsulating and governing these three entities, each operating within its domain and influenced by its overarching parameters. Virtual private cloud network 504 may be a secured, isolated virtual network within the broader cloud environment, tailor-made to suit the unique needs of its workload, be it scalability, security, or flexibility. Classic network 506 may represent a more traditional cloud networking setup, offering standardized connectivity solutions and perhaps a less granular control compared to its virtual private cloud counterpart. Transit gateway 508 may represent a network transit hub, facilitating the interconnection of multiple virtual networks, whether they are virtual private clouds, classic networks, or others. Virtual private cloud network 504 and classic network 506 may each have a reciprocal source-target relationship with transit gateway 508. This might signify the transit gateway acting as the nexus point, channeling and directing traffic between the two network types.

As further shown, virtual private cloud network 504 may have a parent-child relationship with client virtual server instance (VSI) 510 and private domain name system (PDNS) 512, with the latter two entities having reciprocal source-target relationships. Such relationships could indicate the client virtual server instance drawing on DNS services from the private domain name system for domain name resolutions, while the private domain name system might utilize resources or information from the virtual server instance. The client virtual server instance 510 might represent a virtual server deployed within the virtual private cloud, facilitating specific workloads or applications. Private domain name system 512, on the other hand, may be tailored for internal network resolutions within the cloud environment.

Next, classic network 506 may have a parent-child relationship with zones 514*a*, 514*b*, and 514*c* and with document database 516, with the latter having reciprocal source-target relationships amongst each other, highlighting interdependencies and interactions. Zones 514*a*, 514*b*, and 514*c* each might consist of a computing node and a zone-specific network load balancer (NLB). These entities may work in tandem to distribute incoming traffic efficiently across multiple nodes, ensuring optimal performance and responsiveness. Document database 516 could signify a specialized database system optimized for storing, retrieving, and managing document-oriented information. Lastly, each of the zones (514*a*, 514*b*, and 514*c*) shares a reciprocal source-target relationship with private domain name system 512. This dynamic could emphasize the role private domain name system plays in ensuring efficient traffic routing and domain resolution across different zones within the classic network.

The IaC, in the form of Terraform, for the transit gateway that bridges the virtual private network and the classic network may be as follows:

```
resource "tg_gateway" "tg_gateway1" {
  name = "demo-transit-gateway"
  ...
}
resource "tg_connection" "tg_connection1" {
  gateway      = tg_gateway.tg_gateway1.id
  network_type = "vpc"
  ...
}
resource "tg_connection" "tg_connection2" {
  gateway      = tg_gateway.tg_gateway1.id
  network_type = "classic"
  ...
}
```

In this example, the "network_type" in the transit gateway connection may be automatically filled from its parent (either the classic network or the virtual private cloud). Attributes like "location," "region," etc., may be automatically filled based on recognized patterns from both parent-child and source-target relationships. The system may thus streamline the IaC generation process by performing attribute value substitution. It may ensure that configurations are consistent, reduce human error, and accelerate the deployment of cloud resources. By understanding the intrinsic relationships between different cloud resources, it may craft an optimized and accurate IaC script.

Figure 6:
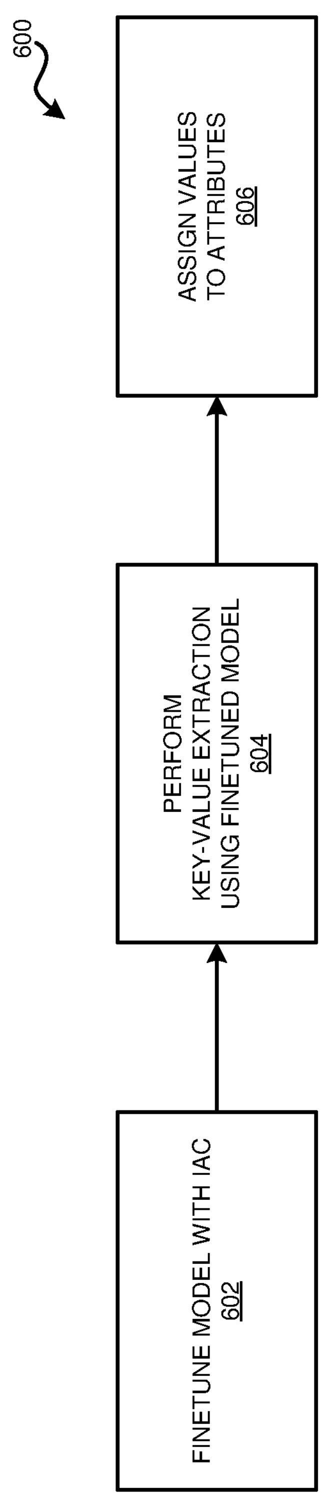
FIG. 6 depicts a block diagram of an example process for intelligent attribute value substitution in IaC generation in accordance with an illustrative embodiment.

With reference to FIG. 6, this figure depicts a block diagram of an example process for intelligent attribute value substitution in IaC generation in accordance with an illustrative embodiment 600. The example block diagram of FIG. 6 may be implemented using attribute value substitution engine 200 of FIG. 1.

At block 602, the process may train a model. The process of training may be helpful for adapting the model to the specific nuances and intricacies of IaC. The initial model, which might be a transformer-based variant such as Generative Pre-trained Transformer (GPT) or Bidirectional Encoder Representations from Transformers (BERT), may begin with a vast knowledge base derived from diverse datasets. This model may be referred to as task agnostic, meaning it is not tailored for a specific task out of the box. The input text for this training process may consist of IaC scripts, configurations, or templates. This data might include, but is not limited to, scripts written in Terraform, CloudFormation, or other IaC languages. By processing these scripts, the model may grasp the unique language constructs, patterns, and semantics inherent to IaC. The goal behind this training may be to leverage the model's pre-trained capabilities and further specialize it for IaC. This process may help ensure that the vast generic knowledge it possesses is augmented with domain-specific information, thereby making it more apt for tasks related to analyzing IaC.

For example, an approach might involve leveraging codebases, such as through the use of a Git repository (e.g., "terraform-provider-ibm" available on GitHub or any other repository). These codebases may contain large amounts of IaC scripts, making them a rich data source. By ingesting this data, transformer models like BERT, GPT-2, and Roberta can be fine-tuned. These models, already equipped with a vast array of general knowledge, can then be imbued with the specific constructs and nuances found in the IaC scripts of these repositories.

At block 604, once the model has been trained using IaC data, it may be deployed for the task of extracting key-value pairs. One of the objectives at this stage may be to generate embeddings. These embeddings may be high-dimensional vectors that capture the essence and semantic meaning of the IaC scripts. Once these embeddings are generated, the model may perform a comparison of the embeddings. This step might involve determining similarities or differences between different parts of the IaC scripts or between multiple scripts. Such comparisons can help in identifying common patterns, redundancies, or unique configurations. After the comparison, the process may group attributes found in the IaC. Grouping may enable the categorization of similar attributes or configurations. For example, attributes related to instance types, such as "t2.micro" or "m5.large," may be grouped together. This categorization may help ensure that the process is able to recognize that different terminologies refer to the same type of resource, enabling the process to analyze and generate IaC.

For example, to assess similarities or differences between these embeddings, metrics such as cosine similarity or Euclidean distance can be employed. The choice of metric might depend on the specific requirements of the task and the nature of the data. After comparison, the process could involve grouping attributes based on a predefined similarity threshold. This threshold could be ascertained using statistical methods, ensuring a certain level of confidence in the groupings. If more dynamic groupings are desired, deep neural networks might be used, making classifications based on the patterns they discern. Additionally or alternatively, unsupervised learning approaches could also be employed, allowing the model to naturally cluster similar attributes without explicit instruction.

At block 606, the process may assign the previously extracted values to specific attributes. This process may involve a structured mapping where each identified key from the IaC scripts is matched with its respective value. For instance, a key such as "instance_type" might be assigned a value of "t2.micro," and this pairing may fall under the group designated for instance types. The objective may be two-fold: First, to ensure a standardized label or category is attached to every piece of data extracted, making it interpretable. Second, to set the stage for any subsequent operations, analyses, or tasks that would require a structured view of the infrastructure's attributes and their values.

For example, content tagging can be used, where each value is tagged based on its contextual relevance and association with certain resources. For instance, a tag might indicate if a value pertains to a certain type of virtual machine or a specific storage configuration. Understanding the type of resource from these tags can be beneficial, such as when dealing with complex cloud infrastructures. Whether it is distinguishing between compute resources, storage configurations, or networking setups, these tags and groupings may simplify the management and interpretation of IaC.

Figure 7:
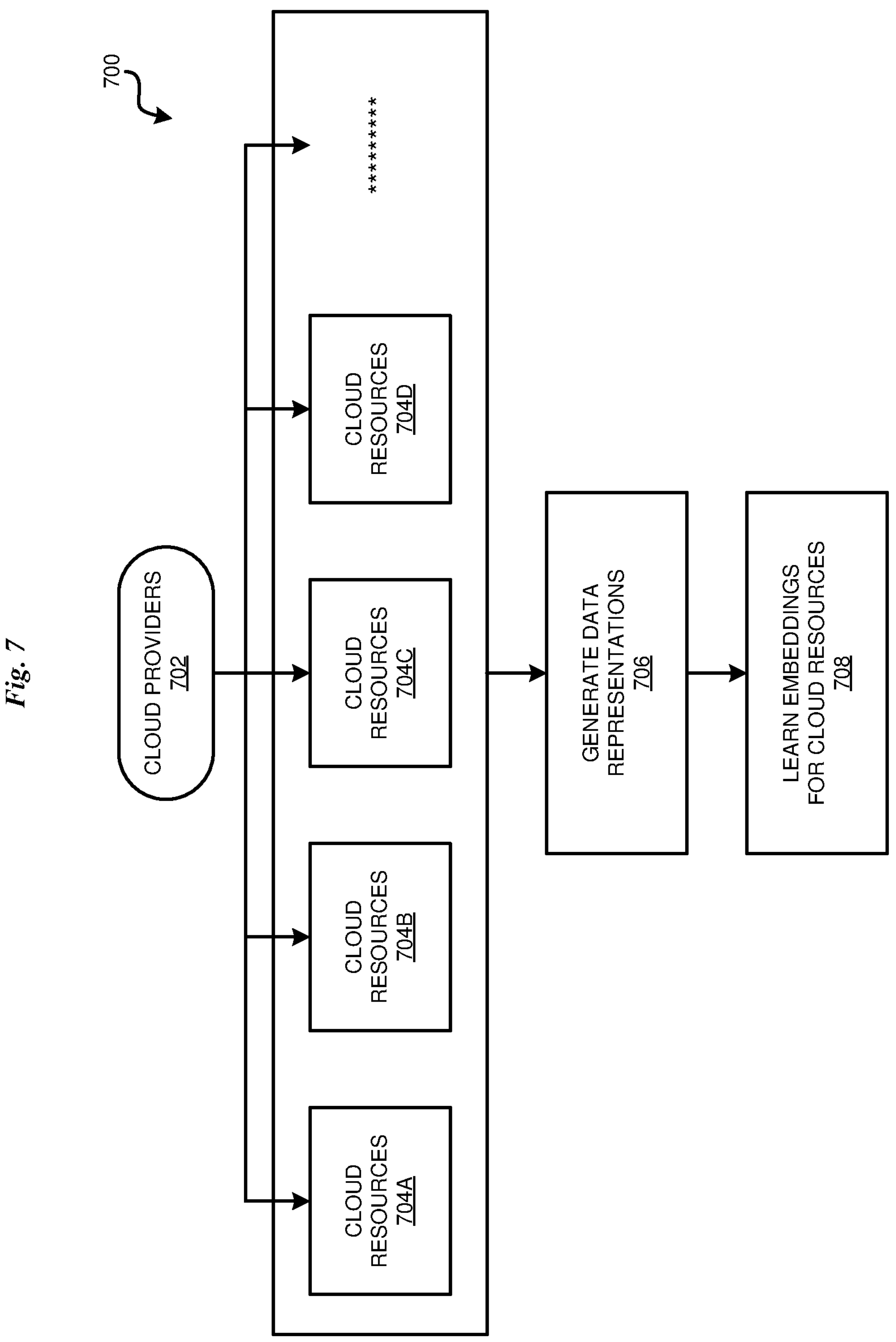
FIG. 7 depicts a block diagram of an example process for training a model to interpret cloud resources from multiple cloud providers in accordance with an illustrative embodiment.

With reference to FIG. 7, this figure depicts a block diagram of an example process for training a model to interpret cloud resources from multiple cloud providers in accordance with an illustrative embodiment 700. The example block diagram of FIG. 7 may be implemented using attribute value substitution engine 200 of FIG. 1.

Cloud providers 702 may denote multiple cloud services from various vendors. Each of these vendors may have their own proprietary services and components. The process may be capable of recognizing and translating components from an array of different providers, ensuring broad compatibility. As shown, each of cloud providers 702 may provide one or more cloud resources, such as cloud resources 704*a*, 704*b*, 704*c*, and 704*d*, which the process may be capable of interpreting. The process may ensure that the generated code aligns with the selected cloud platform, irrespective of the specific service being referred to.

At block 706, the process may generate data representations. These data representations may be a vocabulary of cloud terms and components. Each service or component may be assigned a unique identifier, streamlining its reference in subsequent processes. Components with similar functions, although from different providers, may be categorized under common classes based on their functionalities.

For example, a generated vocabulary might list "virtual machine," "storage bucket," and "network gateway" as categories. Under "virtual machine," identifiers for different cloud provider's virtual machines may be listed. Thus, even if the nomenclatures are different, by referencing the category and the unique identifier, the system may map services across providers.

At block 708, the process may learn embeddings for the cloud resources. For instance, this process may involve using natural language processing (e.g., Word2Vec and Glove on large corpus of data). By employing models to process substantial volumes of data related to cloud services, each component may be provided an embedding. The objective may be to capture the semantic nuances of these components.

For example, technical documentation available for different cloud providers' virtual machines may be used. By processing this data through models like Word2Vec, the system can understand that both of these are related to computing and virtualization, even if the exact terminology or phrasing used in their descriptions varies. Embeddings would thus allow the system to infer the closeness or similarity of services across providers based on the contextual essence captured by these embeddings.

Figure 8:
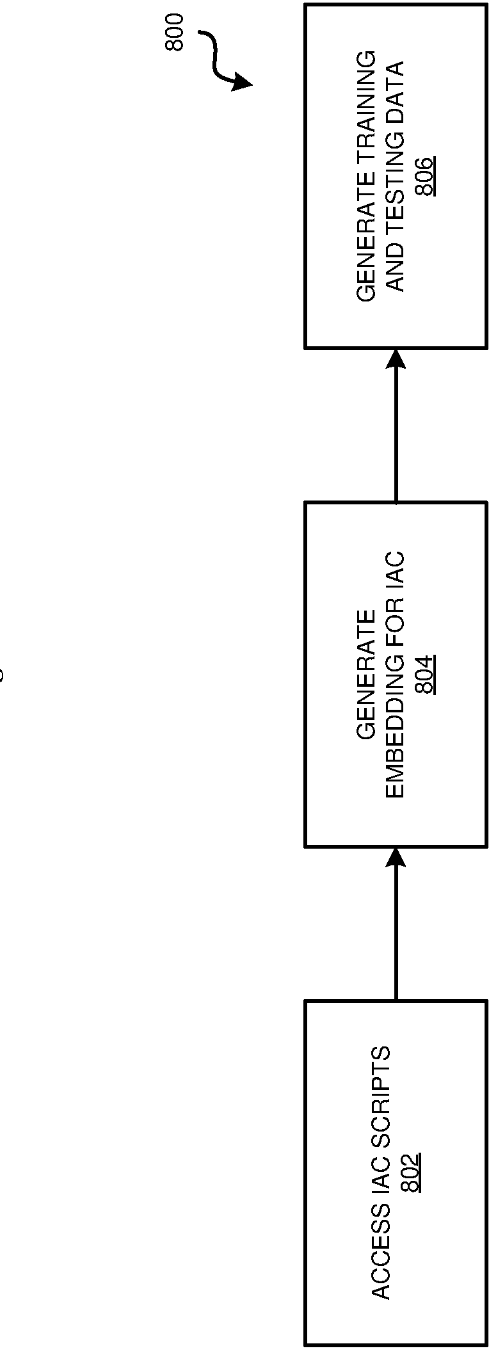
FIG. 8 depicts a block diagram of an example process for generating training and testing data for a model to perform intelligent attribute value substitution in IaC generation in a multi-cloud environment in accordance with an illustrative embodiment.

With reference to FIG. 8, this figure depicts a block diagram of an example process for generating training and testing data for a model to perform intelligent attribute value substitution in IaC generation in a multi-cloud environment in accordance with an illustrative embodiment 800. The example block diagram of FIG. 8 may be implemented using attribute value substitution engine 200 of FIG. 1.

In the depicted example, at block 802, the process may access data associated with IaC scrips. These IaC scrips may represent foundational blueprints for a cloud configuration, which may cater to different service models and deployment strategies. This data may form the bedrock on which the subsequent processes are built upon. For instance, an IaC scrip for a cloud provider might detail the instantiation of EC2 instances, the configuration of an RDS database, and the establishment of a VPC with associated security groups. This process may involve accessing a database containing data about IaC scrips, and it may also include discerning the patterns, associations, and intricacies among the various architectural elements of IaC.

At block 804, the process may generate embeddings for IaC. An embedding, in this context, may refer to a mathematical representation of an individual component within the IaC. Embeddings translate high-dimensional data into a lower-dimensional space, preserving the critical relationships between the data points. This process may involve mapping the embeddings of each component with those that have been previously learned, ensuring a cohesive representation of the infrastructure's components. It may involve extracting the most pertinent features and characteristics of the IaC components to ensure a comprehensive representation. The process might involve employing deep learning techniques, such as neural networks, to convert each IaC component into a numerical vector. As an illustrative example, a database and its corresponding storage might be closely embedded due to their related nature, while a computer instance may be distantly embedded from a network policy.

In some embodiments, the embeddings may be generated using a trained model, such as the model trained in accordance with the description of FIG. 7. This model may serve as a foundational structure, bringing an added layer of expertise as a result of its training with different cloud provider's data. For example, the process might employ a transformer architecture or a recurrent neural network (RNN), fine-tuned to understand the temporal and structural nuances of various cloud provider's scripts.

At block 806, the process may generate training and testing data. The training data may embody specific configurations and patterns inherent in IaC. This data might sometimes be introduced with intentional noise. This introduction of noise may help ensure that the encoder and decoder models undergo rigorous training, facilitating them to learn and adapt to various representations. For example, the training data might encapsulate distinct configurations, like Kubernetes deployments or storage setups. By deliberately injecting noise, such as randomized resource names or shuffled order of declarations, the system may ensure the encoder-decoder model refines its ability to detect and rectify inconsistencies. For instance, introducing a missing dependency in a Terraform script might force the model to recognize and predict the missing link. Similarly, the testing data may be a dataset designed to challenge and assess the proficiency of the model, ensuring it meets the desired benchmarks. The testing data may act as the yardstick for model evaluation. It may also comprise intricate IaC configurations, such as edge cases, including multi-region deployments or hybrid cloud setups, testing the model's robustness and adaptability.

Figure 9:
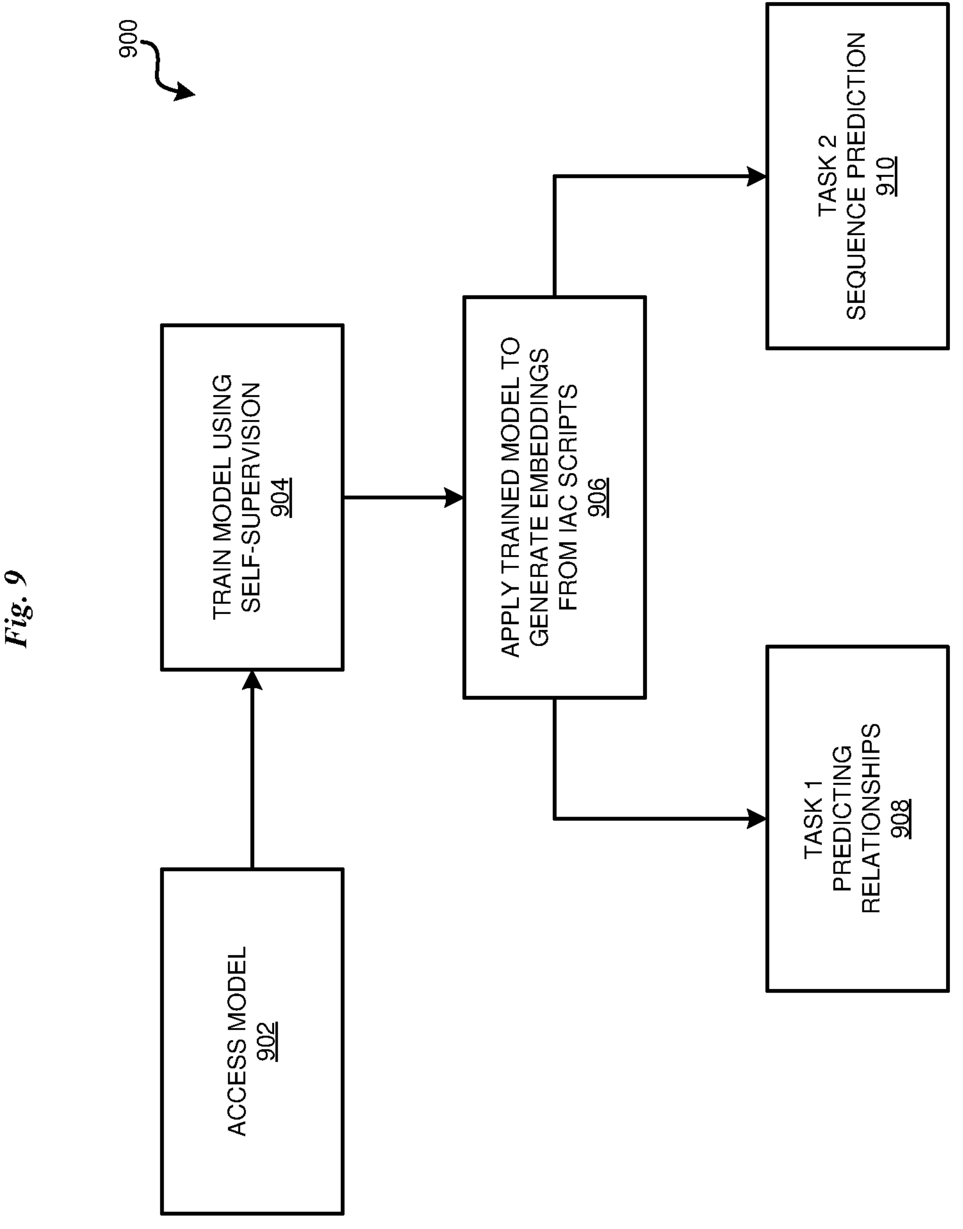
FIG. 9 depicts a block diagram of an example process for training a model to perform intelligent attribute value substitution in IaC generation in a multi-cloud environment in accordance with an illustrative embodiment.

With reference to FIG. 9, this figure depicts a block diagram of an example process for training a model to perform intelligent attribute value substitution in IaC generation in a multi-cloud environment in accordance with an illustrative embodiment 900. The example block diagram of FIG. 9 may be implemented using attribute value substitution engine 200 of FIG. 1.

At block 902, the process may access a model, such as a graph neural network (GNN) or a transformer-based model. This model may be architecturally tailored to learn the embeddings and relations between various cloud resources. Its adeptness may lie in discerning relationships between cloud resources depicted in diagrams and/or associated IaC code, such as the relationship between a virtual machine and its associated storage or network resources. For example, an architect may use draw.io to design a multi-layered architecture, interlinking a serverless computing service with a cloud object storage, and further connecting the cloud object storage with a content delivery network. Each of these links may represent relationships that the model, once trained, can intelligently map and convert into actionable IaC, regardless of the cloud provider in question.

In some embodiments, the model may comprise a plurality of machine learning models. For instance, GNN might be adept at understanding the intricate interconnections of cloud resources, while a transformer could parse through configurations to recognize patterns. Further, in some embodiments, each machine learning model may be trained using data associated with a particular cloud provider. For example, a GNN might be trained using data curated from one cloud provider's infrastructure patterns, thereby being particularly adept at identifying relations between resources associated with that cloud provider.

Accessing the model may include tasks such as fetching pre-trained weights, adjusting hyperparameters tailored to the IaC context, and ensuring that the model architectures are compatible with the data input types. For example, while accessing a transformer model, the process might require converting IaC scripts into tokenized sequences, aligning with the model's input structure.

At block 904, the process may train the model using self-supervision. Self-supervision, in this context, may refer to the model learning to predict parts of the data from other parts, without needing explicit labels, such as through the use of an encoder-decoder-based architecture. For example, an architect's decision to use "protocol" in one cloud setup might be analogous to "method" in another. Similarly, "location" might resonate with "zone" or "region" depending on the cloud provider. By feeding the model numerous such IaC instances, it may learn these synonymic relations. This way, when an architect labels a cloud provider's function with a particular "method," the model may know it is referring to the "protocol" used, ensuring the resultant IaC is finely tuned. In some embodiments, the training and testing data used to train the model may be generated using the process described in connection with FIG. 8.

Such a self-supervised training strategy may involve techniques like masking certain IaC configurations and training the model to predict the masked components, contrastive learning where representations of similar IaC configurations are brought closer in the embedding space, or generative approaches where the model reconstructs the entire IaC script, among others. For instance, a model might be fed a Terraform script with random resources masked and may then be trained to regenerate the missing parts accurately. Additionally or alternatively, a model might be presented with a partial draw.io diagram or its associated IaC where specific resources have some attributes masked. Through self-learning, the model may predict these missing attributes, understanding, for example, that an "is_ipsec_policy" with an "authentication_algorithm sha256" denotes a specific security protocol, similar to "md5" (message-digest algorithm) or "sha1" (Secure Hash Algorithm 1).

At block 906, the process may apply the trained model to generate embeddings from IaC scrips. These embeddings may represent the semantic meaning and inter-relations of various IaC components. For example, the embedding for a cloud provider's cloud object storage might be closely related to a serverless computing service's function if they often interact within various architectures. These embeddings may encapsulate the essence, the relationships, or the nuances of various IaC components. For example, a network resource on one cloud provider, depicted with a certain set of attributes on a diagram, might have an embedding closely mirroring a similar resource on other cloud providers, which the model may learn to correlate as similar as a result of its training.

Generating embeddings from IaC scrips may involve preprocessing steps like tokenization of the IaC scripts, normalization of configurations, and dynamic adjustments based on the specific cloud provider context. For example, the model may ingest a draw.io diagram or associated IaC code, tokenize its elements, normalize configurations, and align them with the specific cloud context. A "Bucket Name" for one cloud provider, for instance, might be translated differently from a cloud storage from other cloud providers. However, the model may learn to discern this nuance, helping ensure that its final IaC script is both accurate and optimized.

At block 908, the process may perform the task of predicting relationships in the IaC using the trained model. A relationship may represent a structural or functional interconnection between different cloud resources. In some embodiments, the relationships may include one of a parent-child relationship (e.g., where a virtual private cloud is the parent of a subnet), a source-target relationship (e.g., denoting data flow), and an overlap relationship where resources might include both parent-child and source-target relationships.

For example, a relationship might identify that a specific database is the primary data store for a particular web application server. When an architect designs a cloud setup, they often implicitly weave relationships: a cloud-computing platform instance communicating with a cloud database environment, which may be denoted by a mere line, may define a source-target relationship, indicating data flow, potential security considerations, and perhaps latency implications. The model may learn to understand these implicit nuances, ensuring the generated IaC resonates with the actual architectural intent.

Predicting the relationship may involve deciphering the IaC scripts, extracting potential relations, and validating these against known patterns. For instance, if a cloud-computing platform instance in a cloud provider's setup continually communicates with a cloud database environment instance, the model might infer a source-target relationship. A parent-child relationship, like a virtual private cloud encapsulating multiple subnets, may have different implications compared to a parent-child relationship. The model, enriched by its training, may predict these relationships, ensuring the IaC is robust, optimized, and aligned with best practices.

For example, the model may be fed with draw.io diagrams and/or associated IaC, which the model may tokenize, analyze, and process to extract potential relationships. Subsequently, the model may validate these extracted relationships against known patterns. For instance, the model may be validated using a testing dataset and/or additional testing metrics, such as IaC best practices for security and efficiency. The model may then be further trained based on its outcomes and performance until a desired convergence or performance metric is reached.

At block 910, the process may perform the task of sequence prediction in the IaC using the trained model. A sequence prediction may involve predicting the order of resource instantiation or determining the sequence of operations in an IaC script. For example, before initializing a virtual machine, its corresponding network configurations, like a virtual network in one cloud provider or virtual private cloud in another, must be established. If the sequence is incorrect, the IaC script might fail, emphasizing the significance of this predictive task. The model, enriched by its training, may predict these sequences, ensuring the IaC is robust, optimized, and aligned with best practices.

For example, similar to the task of relationship prediction, the model may be fed with draw.io diagrams and/or associated IaC, which the model may tokenize, analyze, and process to extract sequences. Subsequently, the model may validate these extracted sequences against known patterns. For instance, the model may be validated using another testing dataset and/or additional testing metrics, such as IaC best practices for security and efficiency. The model may then be further trained based on its outcomes and performance until a desired convergence or performance metric is reached, as noted previously.

Figure 10:
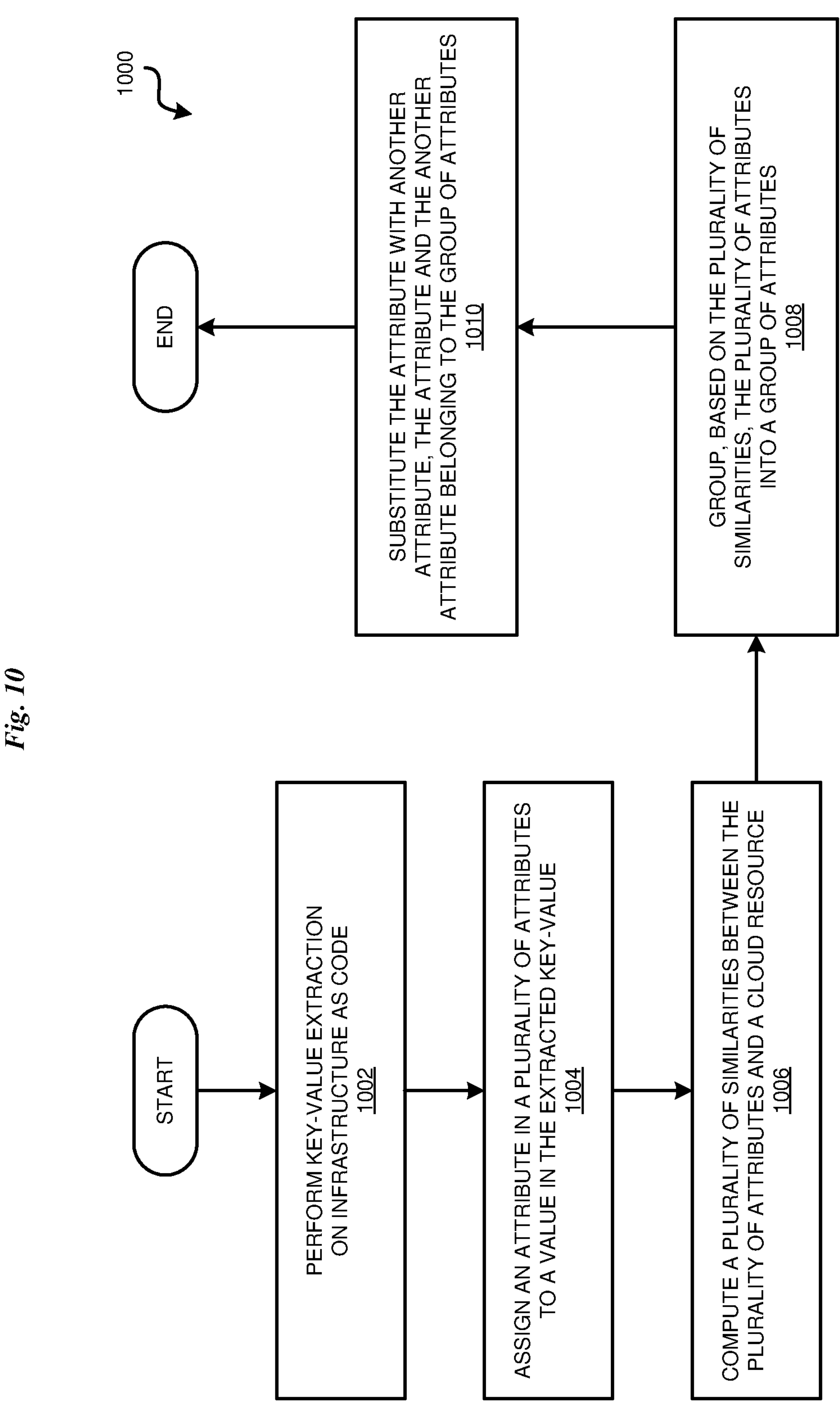
FIG. 10 depicts a block diagram of an example process for intelligent attribute value substitution in IaC generation in accordance with an illustrative embodiment.

With reference to FIG. 10, this figure depicts a block diagram of an example process for intelligent attribute value substitution in IaC generation in accordance with an illustrative embodiment 1000. The example block diagram of FIG. 10 may be implemented using attribute value substitution engine 200 of FIG. 1.

In the illustrative embodiment, at block 1002, the process performs key-value extraction on infrastructure as code. At block 1004, the process assigns an attribute in a plurality of attributes to a value in the extracted key-value. At block 1006, the process computes a plurality of similarities between the plurality of attributes and a cloud resource. At block 1008, the process groups, based on the plurality of similarities, the plurality of attributes into a group of attributes. At block 1010, the process substitutes the attribute with another attribute, the attribute and the another attribute belonging to the group of attributes. It is to be understood that steps may be skipped, modified, or repeated in the illustrative embodiment. Moreover, the order of the blocks shown is not intended to require the blocks to be performed in the order shown, or any particular order.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

performing, by an attribute value substitution engine comprising a machine learning model, wherein the machine learning model is configured to perform relationship prediction and sequence prediction from infrastructure as code, key-value extraction on the infrastructure as code;

assigning, by the attribute value substitution engine, an attribute in a plurality of attributes to a value in the extracted key-value;

computing, by the attribute value substitution engine, a plurality of similarities between the plurality of attributes and a cloud resource;

grouping, based on the plurality of similarities, the plurality of attributes into a group of attributes;

substituting, by the attribute value substitution engine, the attribute with another attribute, the attribute and the another attribute belonging to the group of attributes; and causing, by the attribute value substitution engine, deployment of one or more cloud resources using the another attribute.

2. The method of claim 1, further comprising:

determining, by the attribute value substitution engine based on a diagram associated with the infrastructure as code, a relationship between the cloud resource and another cloud resource in the diagram, the relationship comprising at least one of a parent-child relationship, a source-target relationship, and an overlap relationship.

3. The method of claim 1, further comprising:

determining, by the attribute value substitution engine, a parent-child relationship between the cloud resource and another cloud resource; and substituting the attribute with the another attribute based on the parent-child relationship.

4. The method of claim 3, wherein the substituting the attribute with the another attribute based on the parent-child relationship further comprises substituting a first attribute associated with a child cloud resource with a second attribute associated with a parent cloud resource.

5. The method of claim 1, further comprising:

determining, by the attribute value substitution engine, a source-target relationship between the cloud resource and another cloud resource; and substituting the attribute with the another attribute based on the source-target relationship.

6. The method of claim 5, wherein the substituting the attribute with the another attribute based on the source-target relationship further comprises substituting a first attribute associated with a source cloud resource with a second attribute associated with a target cloud resource.

7. The method of claim 1, further comprising:

training the machine learning model using a plurality of cloud resources; and training the machine learning model using a plurality of infrastructure as code scripts.

8. A computer program product comprising one or more computer readable storage media, and program instructions collectively stored on the one or more computer readable storage media, the program instructions executable by a processor to cause the processor to perform operations comprising:

performing, by an attribute value substitution engine comprising a machine learning model, wherein the machine learning model is configured to perform relationship prediction and sequence prediction from infrastructure as code, key-value extraction on the infrastructure as code;

assigning, by the attribute value substitution engine, an attribute in a plurality of attributes to a value in the extracted key-value;

computing, by the attribute value substitution engine, a plurality of similarities between the plurality of attributes and a cloud resource;

grouping, based on the plurality of similarities, the plurality of attributes into a group of attributes;

substituting, by the attribute value substitution engine, the attribute with another attribute, the attribute and the another attribute belonging to the group of attributes; and causing, by the attribute value substitution engine, deployment of one or more cloud resources using the another attribute.

9. The computer program product of claim 8, further comprising:

determining, by the attribute value substitution engine based on a diagram associated with the infrastructure as code, a relationship between the cloud resource and another cloud resource in the diagram, the relationship comprising at least one of a parent-child relationship, a source-target relationship, and an overlap relationship.

10. The computer program product of claim 8, further comprising:

determining, by the attribute value substitution engine, a parent-child relationship between the cloud resource and another cloud resource; and substituting a first attribute associated with a child cloud resource with a second attribute associated with a parent cloud resource.

11. The computer program product of claim 8, further comprising:

determining, by the attribute value substitution engine, a source-target relationship between the cloud resource and another cloud resource; and substituting a first attribute associated with a source cloud resource with a second attribute associated with a target cloud resource.

12. The computer program product of claim 1, further comprising:

training the machine learning model using a plurality of cloud resources; and training the machine learning model using a plurality of infrastructure as code scripts.

13. A computer system comprising a processor and one or more computer readable storage media, and program instructions collectively stored on the one or more computer readable storage media, the program instructions executable by the processor to cause the processor to perform operations comprising:

performing, by an attribute value substitution engine comprising a machine learning model, wherein the machine learning model is configured to perform relationship prediction and sequence prediction from infrastructure as code, key-value extraction on the infrastructure as code;

assigning, by the attribute value substitution engine, an attribute in a plurality of attributes to a value in the extracted key-value;

computing, by the attribute value substitution engine, a plurality of similarities between the plurality of attributes and a cloud resource;

grouping, based on the plurality of similarities, the plurality of attributes into a group of attributes;

substituting, by the attribute value substitution engine, the attribute with another attribute, the attribute and the another attribute belonging to the group of attributes; and causing, by the attribute value substitution engine, deployment of one or more cloud resources using the another attribute.

14. The computer system of claim 13, further comprising:

determining, by the attribute value substitution engine based on a diagram associated with the infrastructure as code, a relationship between the cloud resource and another cloud resource in the diagram, the relationship comprising at least one of a parent-child relationship, a source-target relationship, and an overlap relationship.

15. The computer system of claim 13, further comprising:

determining, by the attribute value substitution engine, a parent-child relationship between the cloud resource and another cloud resource; and substituting a first attribute associated with a child cloud resource with a second attribute associated with a parent cloud resource.

16. The computer system of claim 13, further comprising:

determining, by the attribute value substitution engine, a source-target relationship between the cloud resource and another cloud resource; and substituting a first attribute associated with a source cloud resource with a second attribute associated with a target cloud resource.

* * * * *